United States Patent

Dorer et al.

(10) Patent No.: US 6,509,288 B1
(45) Date of Patent: Jan. 21, 2003

(54) POLYMERIZATION CATALYSTS

(75) Inventors: Birgit Angelika Dorer, Mutterstadt (DE); Christopher Sharp, Staines (GB); Richard Henry Weatherhead, Addlestone (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/443,896

(22) Filed: Nov. 19, 1999

Related U.S. Application Data

(63) Continuation of application No. PCT/GB98/02037, filed on Jul. 10, 1998.

(30) Foreign Application Priority Data

Jul. 22, 1997 (GB) .............................................. 9715317

(51) Int. Cl.$^7$ .............................. B01J 3/20; B01J 31/22; C08F 4/64
(52) U.S. Cl. ....................... 502/152; 502/103; 502/120; 502/161; 526/134; 526/129; 526/160; 526/165; 526/943
(58) Field of Search ................................ 502/103, 120, 502/152, 161

(56) References Cited

U.S. PATENT DOCUMENTS

| | | | | |
|---|---|---|---|---|
| 5,444,134 A | * | 8/1995 | Matsumoto | 526/159 |
| 5,461,127 A | * | 10/1995 | Naganuma et al. | 526/127 |
| 5,565,397 A | * | 10/1996 | Sangokoya | 502/129 |
| 5,807,936 A | * | 9/1998 | Fritze et al. | 526/126 |

FOREIGN PATENT DOCUMENTS

| | | |
|---|---|---|
| EP | 0 519 746 A1 | 12/1992 |
| EP | 0 591 756 A2 | 4/1994 |

* cited by examiner

Primary Examiner—Caixia Lu
(74) Attorney, Agent, or Firm—Nixon & Vanderhye

(57) ABSTRACT

Catalyst system suitable for preparing substantially terminally unsaturated atactic polymers or copolymers of α-olefins having a molecular weight (Mn) in the range 200–500,000. The catalyst system includes a metallocene of the formula:

$$[R_m CpH_{(5-m)}][R_n CpH_{(5-n)}]M(Z)Y$$

wherein CpH is a cyclopentadienyl ligand, each R represents an alkyl or an aryl substituent on the CpH ligand or two R's may be joined together to form a ring, or the Rs in each CpH group when taken together represents an Si or C bridging group linking two CpH groups wherein the Si or C group may itself be substituted by hydrogen atoms or C1–C3 alkyl groups, M is a metal selected from hafnium, zirconium and titanium, Z is selected from a hydrogen atom, a trifluoromethane sulphonate, an alkyl and an aryl group, Y is selected from a, 1,3-diketonate and a β-ketoester arion, and each of m and n is same or different and has a value from 0 to 5.

13 Claims, No Drawings

POLYMERIZATION CATALYSTS

This is a continuation of PCT application PCT/GB98/02037, filed Jul. 10, 1998, the entire content of which is hereby incorporated by reference in this application.

The present invention relates to a catalyst system for use in the preparation of substantially terminally unsaturated polyolefins.

Substantially terminally unsaturated polyolefins where the terminal group in the polymer is a vinylidene group have been used as starting materials for the preparation of a variety of compounds for example oil additives, sealants, dispersants, cleaning agents, etc. Such terminally unsaturated polyolefins, especially poly(iso)butenes, have been prepared using various catalysts such as eg boron trifluoride as claimed and described in our EP-A-0145235 and EP-A-0671419. Other processes have been used to produce conventional polymers of 1-olefins using catalysts such as metallocenes alone or in combination with an activator/cocatalyst such as methylaluminoxane. Polyolefins which can be produced by the latter method include homopolymers of propylene, 1-butene, 1-pentene, 1-hexene and 1-octene as well as copolymers of such olefins with one another, in particular copolymers of propylene eg with ethylene. Such polyolefins are characterised by a low molecular weight typically in the range 300–5000.

A particular advantage of such terminally unsaturated polymers is their high degree of reactivity especially towards enophiles such as unsaturated dicarboxylic acid anhydrides which make them particularly suitable for the ene/enophile reactions which enable functionalisation of such polymers into useful products such as lubricating oil additives.

For example EP-A-353935 describes ethylene/alpha-olefin copolymer substituted mono- and dicarboxylic acid lubricant dispersant additives in which the ethylene copolymer is prepared by use of bis(n-butylcyclopentadienyl) zirconium dichloride catalyst and methylaluminoxane (MAO) cocatalyst.

EP-A490454 describes alkenyl succinimides as lube oil additives comprising an alkenyl substituent group derived from a propylene oligomer which is conveniently prepared using as a catalyst a bis(cyclopentadienyl)zirconium compound and cocatalyst MAO.

Similarly, EP-A-268214 describes the use of an alkyl substituted cyclopentadienyl compound of zirconium or hafnilum for the oligomerisation of propylene. A vast number of compounds are listed which include inter alia [(CH3)$_5$C$_5$]$_2$ZrCl$_2$. However, all the compounds listed are bis (penta-alkyl substituted cyclopentadiene) derivatives of zirconium or hafnium and these tend to give rise to polymers in which the terminal unsaturated linkage is predominantly a vinyl linkage.

In such prior art preparations the metallocenelcocatalyst systems are used in solution phase with the metallocene/cocatalyst dissolved in or miscible with the liquid reactants or in an inert solvent containing dissolved gaseous reactants.

We have now found that by using specific metallocenel-cocatalyst systems, atactic polyolefins and copolymers thereof may be prepared in a range of molecular weights and having a high degree of terminal vinyldene unsaturation.

Thus according to the present invention there is provided a catalyst system suitable for the preparation of substantially terminally unsaturated atactic polymers or copolymers of α-olefins having a molecular weight (Mn) in the range 200–500,000, said catalyst system comprising a metallocene of the formula:

wherein
CpH is a cyclopentadienyl ligand,
Each R represents an alkyl or an aryl substituent on the CpH ligand or two R's may be joined together to form a ring, or the Rs in each CpH group when taken together represents an Si or C bridging group linking two CpH groups wherein said Si or C group may itself be substituted by hydrogen atoms or C1–C3 alkyl groups,
M is a metal selected from hafnium, zirconium and titanium,
Z is selected from a hydrogen atom, a trifluoromethyl sulphonate (hereafter "triflate"), an alkyl and an aryl group,
Y is selected from a 1,3-diketone, a β-ketoester and a triflate, and each of m and n is same or different and has a value from 0 to 5.

Unless otherwise specified, the terms (co) polymers and (co) polymerisation are used herein and throughout the specification to cover the homopolymerisation and copolymerisation of α-olefins as well as including oligomerisation.

By substantially terminally unsaturated polymers or copolymers is meant polymers or copolymers having ≧60% polymer chains which contain terminal unsaturation.

More specifically, catalysts that may be used to (co) polymerise α-olefins include bis(alkyl cyclopentadienyl) metallocenes wherein R is a suitably a methyl group. Thus, the alkyl substituent on the cyclopentadienyl ligands in the metallocene may be a methyl-; 1,3-dimethyl-; 1,2,4trimethyl-; or tetramethyl-group. Where R represents a substituted or unsubstituted silicon or carbon bridging group linking two CpH ligands, such metallocenes are suitably dimethylsilyl dicyclopentadienyl-zirconium, -hafnium or -titanium compound.

When two R's are joined together the cyclopentadienyl ligand may be represented by indenyl or hydrogenated indenyl.

The metal M in the metallocene may be zirconium, hafnium or titanium. Of these zirconium is preferred.

The group Z in the metallocene catalyst may be a triflate (SO$_3$CF$_3$) or an alkyl group. Where it is an alkyl group, such a group is preferably a C1–C3 alkyl group.

The group Y in the metallocene is selected from a 1,3-diketonate group,a β-ketoester anion and a triflate. The diketonate comprises an anion of the formula

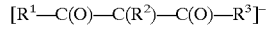

where R$^1$, R$^2$ and R$^3$ may be the same or different alkyl or aryl groups or halogenated alkyl groups and in addition R$^2$ may be a hydrogen atom. The keto-ester anion comprises anions of the formula

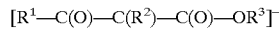

where R$^1$, R$^2$ and R$^3$ may be the same or different alkyl or aryl groups or halogenated alkyl groups and in addition R$^2$ may be a hydrogen atom.

Preferred anions are those wherein the halogenated alkyl groups are fluorinated alkyl groups in particular hexafluoroacetylacetonate.

Particularly suitably complexes suitable for use with the present invention are:

Of these, preferred metallocene catalysts which carry a methyl or a 1,3-dimethyl or a 1,2,4-trimethyl cyclopentadienyl ligands (ie when n is 1–3) give rise to (co)polymers in which the terminal unsaturation is predominantly a vinylidene group eg suitably >97%, preferably >99% vinylidene. However, where the value of each of m and n in these catalysts is 4 or 5, the product may comprise a significant proportion of vinyl terminated groups.

When used as catalysts for (co)polymerising one or more α-olefins, the metallocenes are suitably used in conjunction with a cocatalyst. The cocatalyst may be comprised of an alkylaluminoxane such as eg methyl aluminoxane (hereafter "MAO") with or without the addition of an alkyl aluminium; the latter is suitably tri-isobutyl aluminium (hereafter "TiBAl"). In a catalyst composition comprising the metallocene catalysts of the present invention and aluminoxanes, the mole ratio of catalyst to co-catalyst is suitably in the range from 3000 to 1:1, preferably in the range from 2000 to 10:1. A reduction in the relative ratios of MAO to the alkyl aluminium used in the catalyst within the ranges specified above would significantly reduce the cost of the process. Furthermore, use of an alkyl aluminium may also improve the reaction rate significantly.

Other suitable co-catalysts are Brønsted acids comprising a cation capable of donating a proton and a compatible non-coordinating anion of general formula

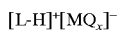

where L is a neutral Lewis base

H is a hydrogen atom,

M is a metal or metalloid selected from groups V-B, VI-B, VII-B, VIII-B, III-A, IV-A, and V-A of the periodic table, and Qs are selected independantly from hydrides, dialkyl amido, alkoxide or hydrocarbyl radicals. Preferred activators are trialkyl ammonium salts of tetra-(pentafluorophenylboron).

A third class of cocatalysts are Lewis acids capable of abstracting an anionic ligand from the metallocene. Examples are tris (pentafluorophenyl) boron and triphenyl-carbenium tetra(pentafluorophenylboron).

The metallocene catalyst and, when used, the cocatalyst may suitably be supported on supports which include organic and inorganic materials such as polymers and inorganic metal and non-metal oxides, in particular porous materials. While conventional support materials may be suitable, supports with particular high porosity are preferred due to their ability to facilitate maximum contact between the reactants and catalyst while retaining the catalyst in supported form.

Examples of suitable support materials are macroporous or mesoporous silica or other non-metal or metal-oxide such as alumina, titania or mixtures of oxides. Alternatively the support may be a polymer. A preferred support is silica.

An important feature of the present invention is that these catalysts, when used to catalyse the (co)polymerisation of α-olefins, give a product which is substantially pure in the sense that they only contain terminal unsaturation and is substantially free of any product which carries internal unsaturation.

The α-olefins to be (co)polymerised suitably have 2 to 25 carbon atoms, preferably 3–8 carbon atoms which may be copolymerised with ethylene. The reactant α-olefin may be essentially pure α-olefins or mixtures of α-olefins with ethylene or dienes such as eg 1,7-octadiene, or, with inert diluents such as saturated hydrocarbons and halogenated solvents and/or minor amounts of other olefins.

The catalysts of the present invention are particularly suitable for use in continuous liquid phase or in continuous fixed bed (co)polymerisation processes.

By using a fixed bed of the supported catalyst easy separation of catalyst and product may be achieved allowing isolation of a product containing very low catalyst residues beneficial for both the further functionalisation of the product as well as ensuring effective use of the catalyst system in a continuous process.

Catalyst separation may also be facilitated in a continuous liquid phase process by judicious selection of catalyst particle size which would allow easy physical separation of catalyst from product.

Operation of a continuous fixed bed process also allows control of residence time by controlling the feed rate. This may allow fine control of product molecular weight in addition to the usual method of temperature variation. For instance, for a given zirconocene catalyst according to the present invention, increasing the reaction temperature is likely to decrease the molecular weight of the (co)polymer product whereas increasing the monomer concentration is likely to increase the molecular weight of the polymer. Whichever technique is used, the polymers made using the catalysts of the present invention have a low molecular weight distribution, ie Mw/Mn=1.5 to 3, wherein Mw represent the weight average molecular weight and Mn represents the number average molecular weight of the (co)polymer.

Thus, according to a further embodiment, the present invention is a process for the preparation of substantially pure terminally-unsaturated polymers or copolymers of α-olefins, said process comprising polymerising or co-polymerising the α-olefin(s) in the presence of a catalyst composition comprising a metallocene of the formula:

wherein

CpH is a cyclopentadienyl ligand,

Each R represents an alkyl or an aryl substituent on the CpH ligand or the R's may be joined together to form a ring, or the Rs in each CpH when taken together represent an Si or C bridging group linking two CpH groups wherein said Si or C group may itself be substituted by hydrogen atoms or C1–C3 alkyl groups, M is a metal selected from hafnium, zirconium and titanium, Z is selected from a hydrogen atom, a trifluoromethyl sulphonate (hereafter "triflate"), an alkyl group an aryl group, Y is selected from a 1,3-diketonate, a β-ketoesteranion and a triflate, and each of m and n is the same or different and has a value from 0 to 5.

The (co)polymerisation reaction is suitably carried out in the liquid/vapour phase. Where it is carried out in the liquid phase, it is preferable that the reactants and catalysts are dissolved in a diluent which may be a saturated/unsaturated or aromatic hydrocarbon or a halogenated hydrocarbon which is/are normally inert under the reaction conditions and which do not interfere with the desired (co)polymerisation reaction. Examples of suitable solvents that may be used include inter alia toluene, xylene, isobutane, propane, hexane, propylene etc. It is important that the reactants, catalysts and solvents, if any, used are pure and dry and contain no polar groups or contaminants.

The (co)polymerisation reaction is suitably carried out at a temperature in the range from 20 to 150° C., preferably in the range from 50 to 100° C. If it is desired to vary the molecular weight of a product (co)polymer for a given catalyst this variation—whilst difficult—is conventionally achieved by a significant change in the reaction conditions. For instance, more dilution may be needed or the reaction may have to be run at higher temperatures to achieve a product of relatively lower molecular weight. Raising the temperature within this range is not favoured since this may lead to α-olefin mis-insertion into the growing (co)polymer chain thereby leading to earlier termination and to the formation of less favoured internal olefin functionality in the (co)polymer. However, using the novel metallocene catalyst systems of the present invention, the molecular weight may be more easily controlled/varied by change of the nature of the leaving groups for a given catalyst system without sacrificing the benefit of high vinylidene content in the product (co)polymer.

The terminally unsaturated polymers of the present invention can be used either directly or be readily further derivatised using the high terminal unsaturation to make products suitable for use as fuel and lubricant additives such as dispersants, wax modifiers, flow improvers, dispersant-viscosity index improvers, viscosity modifiers and the like. The molecular weight of the polymers prepared according to the present invention are tailored according to the application required. For example Mn is maintained in the range from about 300 to about 10,000 for dispersant applications and from about 15,000 to about 500,000 for viscosity modifier applications. Where the polymer is required to have some dispersancy performance it is necessary to introduce polar functionality which enables the molecule to bind well to engine deposits and sludge forming materials.

Thus according to another aspect of the present invention there is provided a method of controlling the molecular weight of substantially terminally unsaturated atactic polymers or copolymers of α-olefins having a molecular weight in the range 200–500,000 by use of a catalyst system as hereinbefore described.

The reaction is suitably carried out in pressure range 10–40 bar but can be carried out at lower or higher pressures. The duration of the reaction is suitably in the range from 1 to 20 hours, preferably from 1 to 10 hours, and is usually from 1 to 3 hours.

The reaction when complete is terminated by venting the reactor and reducing the reaction temperature to about 20° C. A lower alcohol such as eg isopropanol can be added to the reactor after venting in order to quench the catalyst. The resulting (co)polymer which is in solution in the reaction solvent such as eg toluene is then drained from the base of the reactor and the reactor then washed with the reaction solvent. A solution of the reaction product in the reaction solvent is then washed with a small amount of dilute acid, eg hydrochloric acid, and then with distilled water, dried with magnesium sulphate, filtered and the reaction solvent removed by evaporation on a rotary evaporator. The evaporation is suitably carried out at 120 mbar pressure (although higher vacuums can be used) at 85° C. for about 3 hours and the oligomer/polymer is then recovered as residue.

A further feature of the present process is that the (co) polymers thus formed have a relatively low level of catalyst, cocatalyst or support residues when compared with (co) polymers obtained by (co)polymerisation using conventional catalyst/cocatalyst processes whether in slurry or dissolved form. Furthermore, the process produces atactic (co)polymers. Absence of tacticity is essential since such absence prevents segments of the (co)polymer chains co-crystallising thus giving a cloudy and/or aggregated solution.

According to another aspect of the present invention there are provided substantially terminally unsaturated atatic polymers or copolymers of α-olefins having molecular weight in the range 200–500,000 prepared using a catalyst system as hereinbefore described.

The present invention is further illustrated with reference to the following Examples and Comparative Tests:

EXAMPLES AND COMPARATIVE TESTS (CT)

A. Syntheses of Metallocene Catalysts:

Example 1

To a solution of 307 mg (1 mmol) Bis(1,3-dimethylcyclopentadienyl)zirconium dimethyl in 20 ml of toluene were added 88 μl (1 mmol) trifluoromethanesulfonic acid. The mixture was stirred for one hour, then 102 μl (1 mmol) 2,4-pentanedione were added. The solvent was evaporated to dryness, and the residue recrystallised from ether/hexane 1:5 to yield 247 mg (47%) [1,3-($CH_3$)$_2C_5$ $H_3$]$_2$Zr($CH_3$COCHCOCH$_3$)SO$_3$CF$_3$ as light yellow crystals.

$^1$H-NMR: (d8-toluene, ambient temperature) δ=5.63 (4H, m, Cp-CH), 5.56 (2H, m, Cp-CH), 4.98.(1H, s, acac CH), 1.85 (12H, br s, Cp-CH$_3$), 1.67 (6H, br s, acac Me) $^{13}$C-NMR: (d8-toluene, ambient temperature, DEPT-45) δ=14.7 (CH$_3$-Cp), 26.5 (CH$_3$-acac), 102.3 (CH-acac), 120.7, 129.4 (CH-Cp) $^{19}$F-NMR: (d8-toluene, ambient temperature) δ=−79.4.

Example 2

To a solution of 307 mg (1 mmol) Bis(1,3-dimethylcyclopentadienyl)zirconium dimethyl in 20 ml of toluene were added 88 μl (1 mmol) trifluoromethanesulfonic acid. The mixture was stirred for one hour, then 141 μl (1 mmol) 1,1,1,5,5,5-hexafluoro-2,4-pentanedione were added. The solvent was evaporated to dryness, and the residue recrystallised from toluene/hexane 1:10 to yield 442 mg [1,3-(—CH$_3$)$_2$C$_5$H$_3$]$_2$Zr(CF$_3$COCHCOCF$_3$)SO$_3$CF$_3$ (70%) as bright yellow $^1$H-NMR: (d8-toluene, ambient temperature) δ=5.99 (1H, s, hfacac), 5.72 (2H, s, Cp-CH), 5.45 (4H, s, Cp-CH), 1.86 (6H, s, Cp-CH$_3$), 1.65 (6H, s, Cp-CH$_3$). $^{13}$C-NMR: (d8-toluene, ambient temperature, DEPT-45) δ=13.83, 14.02 ( CH$_3$-Cp), 92.31 (CH-hfacac), 116.286, 117.154, 123.081 ( CH-Cp). $^{19}$ F-NMR: (d8-toluene, ambient temperature) δ=−77.10, −77.39, −79.41

Example 3

To a solution of 307 mg (1 mmol) Bis(1,3-dimethylcyclopentadienyl)zirconium dimethyl in 20 ml of toluene was added 88 μl (1 mmol) trifluoromethanesulfonic acid. The mixture was stirred for one hour, then 127 μl (1 mmol) ethylacetoacetate were added. The solvent was evaporated to dryness, and the residue recrystallised from toluenelhexane 1:10 to yield 422 mg [1,3-(CH$_3$)$_2$C$_5$H$_3$]$_2$Zr (CH$_3$COCHCOOCH$_2$CH$_3$)SO$_3$CF$_3$ (76%) as colourless crystals. $^1$H-NMR: (d8-toluene, ambient temperature) δ=5.76 (2H, s br, Cp-CH), 5.63 (2H, s br, Cp-CH), 5.51 (2H, s br, Cp-CH), 4.82 (1H, s, acac-CH), 4.46 (2H, s br, OC H$_2$CH$_3$), 1.90 (6H, s br, Cp-CH$_3$), 1.85 (6H, s br, Cp-CH$_3$), 1.52 (3H, s, br acac-CH$_3$), 1.09 (3H, s br, OCH$_2$H$_3$) $^{19}$F-NMR: (d8-toluene,ambient temperature) δ=−78.98.

Example 4

(1,3-(CH$_3$)$_2$C$_5$H$_3$)$_2$Zr(CF$_1$COCHCOCF$_3$)CH$_3$

To a solution of 250 mg (0.81 mmol) bis(1,3-dimethylcyclopentadienyl)zirconium dimethyl in 20 ml of toluene was added 115 ml (0.81 mmol) 1,1,1,5,5,5-hexafluoro-2,4-pentanedione at −78° C. The mixture was allowed to reach room temperature and stirred over night. After evaporation of the solvent, the residue was recrystallised from hexane to yield 272 mg (1,3-(CH$_3$)$_2$C$_5$H$_3$)$_2$Zr(CF$_3$COCHCOCF$_3$)CH$_3$ (67%) as a light yellow powder.

$^1$H-NMR: 1.33 (3H, s, Zr-CH$_3$), 1.76, 1.86, 1.91 (12H, 3s, CH$_3$-cp), 5.31 (1H, s, CH-fluoroacac), 5.49, 5.72, 5.78, 5.8 (6H, 4m, CH-cp).

Example 5

(C$_5$H$_5$)$_2$Zr(CF$_3$COCHCOCF$_3$)SO$_3$(CF$_3$

To a solution of 250 mg (0.99 mmol) bis(cyclopentadienyl)zirconium dimethyl in 20 ml of toluene was added 192 ml (0.99 mmol) trimethylsilyl trifluoro methanesulfonate. The mixture was stirred for two days at room temperature, then 140 ml (0.99 mmol) 1,1,1,5,5,5-hexafluoro-2,4-pentanedione was added at −78° C. The mixture was slowly allowed to reach room temperature and stirred overnight. The solvent was evaporated to dryness, and the residue recrystallised from toluene/hexane to yield 336 mg (C$_5$H$_3$)$_2$Zr(CF$_3$COCHCOCF$_3$)SO$_3$CF$_3$ (59%) as a yellow powder.

$^1$H-NMR: 6.02 (1H, s, CH-fluoroacac), 5.76 (10H, 1s, CH-cp).

Example 6

(C$_5$H$_5$)$_2$Zr(CF$_3$COCHCOCF$_3$)CH$_3$

To a solution of 250 mg (0.99 mmol) bis(cyclopentadienyl)zirconium dimethyl in 20 ml of toluene was added 140 ml (0.99 mmol) 1,1,1,5,5,5-hexafluoro-2,4-pentanedione at −78° C. The mixture was slowly allowed to reach room temperature and stirred over night. The solvent was evaporated to dryness, and the residue washed with hexane to yield 286 mg (C$_5$H$_3$)$_2$Zr(CF$_3$COCHCOCF$_3$)CH$_3$ (65%) as a light yellow powder.

$^1$H-NMR: 1.29 (3H, s, Zr-CH$_3$), 5.39 (1H, s, CH-fluoroacac), 5.83, 5.94 (10H, 2s, CH-cp).

Example 7

(1,3-(CH$_3$)$_2$C$_5$H$_3$)Zr(SO$_3$CF$_3$)$_2$

Preparation of bis(1,3 dimethylcyclonentadiene) zirconium ditrinfluoromethanesuli)honate Bis(1,3 dimethylcyclopentadiene)zirconium dichloride (1.75 mmol) was dissolved in dry toluene (50 ml) and to this was added, dropwise with stirring over 30 min, a solution of silver trifluoromethanesulphonate (3.5 mmol) in dry toluene (100 ml). A precipitate of silver chloride formed and the solution was stirred at room temperature for 5h and then left under a nitrogen atmosphere overnight to allow the precipitate to settle. The supernatant solution was removed via a syringe and transferred to a Schlenk tube where the solvent was removed under vacuum at room temperature. The resulting solid was redissolved in dry toluene (6 ml) and placed in a freezer (at −35° C.) attached to a dry box where it was left overnight. The supernatant was removed using a pipette and the solid washed with dry hexane (5 ml) and dry toluene (2×3 ml) and finally dried under vacuum at room temperature to yield 0.35 g of a dark orange solid.

B. Method of Polymerisation for Examples 8–12 and Comparative

Examples 1–2

The following generic process was used to polymerise propylene. A 3-liter autoclave was thoroughly purged by heating under nitrogen. Into the autoclave was introduced (a) 1 liter of dry solvent by transfer line and (b) triisobutyl aluminium (4 ml of 1M) solution in toluene. The autoclave was then sealed and 1 liter of liquid propylene transferred into it. The contents of the autoclave were then stirred at the desired temperature which was maintained by external circulation through the outer jacket of the vessel. The pressure and temperature of the autoclave were logged continuously. Into an injection port attached to the autoclave and previously flushed with nitrogen was added by syringe (a) a solution of catalyst in toluene (see Table catalyst structure and concentration) and (b) a solution of 3 millimoles of methyaluminoxane; after a suitable time (eg 10 minutes) had elapsed, this mixture was injected into the autoclave under a positive pressure and the reaction run for the desired period (see data in Tables below). After venting, the liquid product was drained into a vessel containing a little isopropanol to kill off the catalyst. The resultant product was then washed initially with a little dilute hydrochloric acid and then with distilled water, dried with magnesium sulphate, filtered and the solvent removed by evaporation.

Molecular weights of the products were determined by gel permeation chromatography and by nmr; end group analyses were carried out by $^{13}$C nmr. Using the aforementioned techniques, the polymers and co-polymers of propylene were prepared as shown in the following examples and tables.

The comparative examples (CT-1 and CT-2) use metallocenes readily preparable from the open literature. The data in the Tables clearly show not only the applicability of the catalyst system of the present invention for preparing substantially terminally unsaturated polyolefins but also the improvement in polymerisation rate obtained.

TABLE 1

Effect of leaving group in bis(1,3-dimethylzirconocene) catalyst system on the molecular weight and nature of terminal group in production of atactic polypropene:

| Example | Group 1 | Group 2 | Mn | Mn/Mw | Vinylidene % |
|---|---|---|---|---|---|
| 8 | OSO$_2$CF$_3$ | F$_6$AcAc$^\#$ | 1940 | 2.6 | >97 |
| 9 | Me | F$_6$AcAc$^\#$ | 2230 | n/d | >97 |
| CT-1 | Cl* | Cl* | 2800 | 2.4 | >97 |
| 10 | OSO$_2$CF$_3$ | AcAc$^\#$ | 3500 | 2.4 | >97 |
| 11 | OSO$_2$CF$_3$ | OSO$_2$CF$_3$ | 4700 | 1.9 | >97 |
| CT-2 | CH$_3$* | CH$_3$* | 4500 | 2.6 | >97 |
| 12 | OSO$_2$CF$_3$ | CH3COCH—CO2Et | 4000 | n/d | >97 |

*-Comparative Tests (not according to the invention)
$^\#$-AcAc is an abbreviation for acetylacetonate

TABLE 2

Effect of Leaving Group on Oligomerisation Rate of Propene

| Group 1 | Group 2 | Catalyst micromol | Run Time (mins) | Recovered Wt (g) |
|---|---|---|---|---|
| $OSO_2CF_3$ | $F_6AcAc^\#$ | 12.5 | 32 | 271 |
| Me | $F_6AcAc^\#$ | 5.6 | 70 | |
| Cl* | Cl* | 12.5 | 45 | 272 |
| $OSO_2CF_3$ | $AcAc^\#$ | 12.5 | 40 | 196 |
| $OSO_2CF_3$ | $OSO_2CF_3$ | 12.5 | 58 | 235 |
| $CH_3$* | $CH_3$* | 12.5 | 76 | 226 |
| $OSO_2CF_3$ | CH3COCH—CO2Et | 12.5 | 99 | 260 |

*-Comparative Test (not according to the invention)
-AcAc is an abbreviation for acetylacetonate

Example 13

Preparation of Polypropylene Using Catalyst as Prepared in Example 5

The general method of polymerisation was used with the exception that 25 micromoles of zirconium monotriflate monohexafluoracetylacetonate was employed as catalyst and 50 mls of 10% MAO was used as cocatalyst. The reaction was run for 70 minutes and 321 g of product was recovered. NMR analysis showed the product to be atatic polypropene of Mn 710. Vinylidene termination was found on >97% of the chains.

Example 14

Preparation of an Copolymer of Propene and 1-decene using the Catalyst as Prepared in Example 5

Into the 3L autoclave was placed 0.5 liter toluene, 1liter of 1-decene and 6 ml of a 1M solution of triisobutylaluminium in toluene. The autoclave was sealed and 570 ml of propene added. The mixture was stirred at 70C for two hours. 56 ml of methylaluminoxane as a 10% solution in toluene was injected into the reactor under a positive nitrogen pressure. Subsequently injected was a toluene solution containing 25 micromoles of zirconocene monotriflate monohexafluoracetylacetonate and 4ml of 10% MAO. The reaction was allowed to run for 4.5 hours at 70C. during which the pressure in the reactor reduced from 13 bar to 8 bar.

After venting, the liquid product was drained into a vessel containing a little isopropanol to kill off the catalyst. The resultant product was then washed initially with a little dilute hydrochloric acid and then with distilled water, dried with magnesium sulphate and filtered. The solvent and residual 1-decene were removed by evaporation initially on a rotary evaporator and finally on a high vacuum line to yield 570 g of product. NMR analysis showed this to be a propene/decene copolymer of approximately equimolar composition and to have a Mn value of 540. Vinylidene termination was found on >90% of the chains.

Example 15

Preparation of Polypropene Using Catalyst as Prepared in Example 6

The general method of polymerisation was used with the exception that 25 micromoles of zirconocene monomethyl monohexafluoroacetylacetonate was employed as catalyst and 30 mls of 10% MAO was used as cocatalyst. The reaction was run for 120 minutes and 320 g of product was recovered. The nmr showed that the product was atactic polypropylene with Mn 2470. Vinylidene termination was found on 94% of the chains.

Example 16

Preparation of a Copolymer of Propene and Ethylene Using Catalyst as Prepared in Example 6

A 3-liter autoclave was thoroughly purged by heating under nitrogen. Into the autoclave was introduced (a) 1 liter of dry solvent by transfer line and (b) triisobutyl aluminium (4ml of 1M) solution in toluene. The autoclave was then sealed and 1 liter of liquid propylene transferred into it and the mixture stirred at 70C. Ethylene gas (10 liters STP) was then fed into the autoclave via a mass flow controller. Methylaluminoxane (25m1 of 10% wt) was injected into the autoclave under a positive nitrogen pressure followed by a toluene solution containing 25 micromoles of zirconocene monomethyl monohexafluoroacetylacetonate and 4 ml of 10% MAO. Ethylene was then passed into the autoclave at such a rate so as to maintain the ratio of the concentrations of ethylene to propene at approximately 0.035. The reaction was allowed to proceed for two hours. The product was worked up as described in the general procedure.

The recovered yield was 482 g of product. NMR analysis showed this to be a propene/ethene copolymer of 2/1 mole ratio and to have a Mn value of 1270. Vinylidene termination was found on 96% of the chains.

We claim:

1. A catalyst system for the preparation of substantially terminally unsaturated atactic polymers or copolymers of α-olefins having a molecular weight (Mn) in the range 200–500,000, said catalyst system comprising a metallocene of the formula:

wherein
CpH is a cyclopentadienyl ligand,
Each R represents an alkyl or an aryl substituent on the CpH ligand or two R's may be joined together to form a ring, or the Rs in each CpH group when taken together represents an Si or C bridging group linking two CpH groups wherein said Si or C group may itself be substituted by hydrogen atoms or C1–C3 alkyl groups,
M is a metal selected from the group consisting of hafnium, zirconium and titanium,
Z is selected from the group consisting of a hydrogen atom, a trifluoromethane sulphonate, an alkyl and an aryl group,
Y is selected from the group consisting of a halogenated and a 1,3-diketonate β-ketoester arion, and
each of m and n is same or different and has a value from 0 to 5.

2. A catalyst system according to claim 1 wherein M is zirconium.

3. A catalyst system according to claim 1 wherein Z is C1–C3 alkyl or trifluoromethyl sulphonate.

4. A catalyst system according to claim 1 wherein the halogenated 1,3-diketonate is hexafluoroacetylacetonate.

5. A catalyst system according to claim 1 wherein the complex is:

6. A catalyst system according to claim 1 wherein R is methyl and n is 1–3.

7. A catalyst system according to claim 1 comprising a cocatalyst.

8. A catalyst system according to claim 7 wherein the cocatalyst is an aluminoxane.

9. A catalyst system according to claim 8 wherein the mole ratio of catalyst to cocatalyst is in the range 3000 to 1:1.

10. A catalyst system according to claim 7 wherein the cocatalyst is a Bronsted acid or a Lewis acid.

11. A catalyst system according to claim 10 wherein the cocatalyst is a trialkylammonium salt of tetra (pentafluorophenyl) boron or tris (pentafluorophenyl) boron.

12. A catalyst system according to claim 1 wherein the catalyst system is supported.

13. A catalyst system according to claim 12 wherein the support is silica.

* * * * *